United States Patent [19]

Undin

[11] Patent Number: 5,245,894
[45] Date of Patent: Sep. 21, 1993

[54] STRIPPING PLIERS

[75] Inventor: Hans Undin, Åkersberga, Sweden

[73] Assignee: Weidmuller Interface GmbH & Co., Fed. Rep. of Germany

[21] Appl. No.: 873,221

[22] Filed: Apr. 24, 1992

[30] Foreign Application Priority Data

May 4, 1991 [DE] Fed. Rep. of Germany ....... 4114563

[51] Int. Cl.$^5$ .............................................. H02G 1/12
[52] U.S. Cl. ...................................... 81/9.43; 81/9.41
[58] Field of Search ........................ 81/9.4, 9.51, 9.41, 81/9.42, 9.43, 9.44; 30/90.1, 90.6, 90.8, 91.1, 91.2

[56] References Cited

U.S. PATENT DOCUMENTS

| | | | |
|---|---|---|---|
| 1,065,679 | 6/1913 | Gregson et al. | 81/9.4 X |
| 3,915,037 | 10/1975 | Wiener | 81/9.43 |
| 3,942,397 | 3/1976 | Tanaka | 81/9.41 |
| 4,112,791 | 9/1978 | Wiener | 81/9.43 |
| 4,366,730 | 1/1983 | Casadio | 81/9.43 |
| 4,485,696 | 12/1984 | Bieganski | 81/9.41 |

OTHER PUBLICATIONS

WO91/12642 Aug. 22, 1991 Nilsson International Application under PCT, A Cable Stripping Tool.

Primary Examiner—D. S. Meislin
Attorney, Agent, or Firm—Cushman, Darby & Cushman

[57] ABSTRACT

In a pair of pliers for stripping the insulation from the ends of electrical conductors, comprising i.a. a two-members aggregate for carrying and longitudinally moving a pair of cutting and stripping jaws accommodate with a pair of clamping jaws, comprises a first member of said the two cutting and stripping jaws and a longitudinal rod part at the forward end of which is a plastics joint means in the shape of a forwardly open arc provided which is resilient at least along a portion of its circumference and carries both cutting and stripping jaws.

The second member embodies a resiliently biassed driving lever which is with the aid of pivot means pivotally attached to a handle of the tool. Each of the two members inclusive of their mounting means is integrally made of plastics material so as to embody one single component.

4 Claims, 3 Drawing Sheets

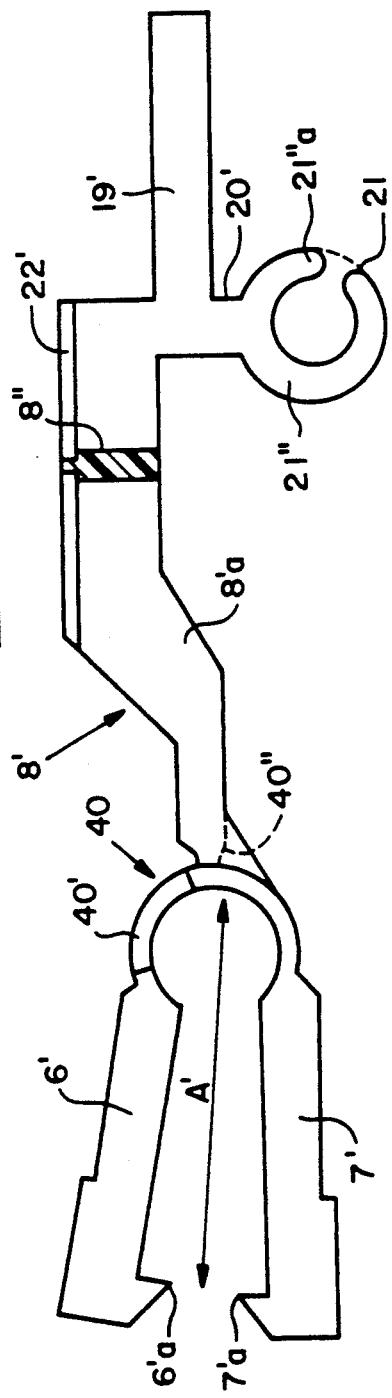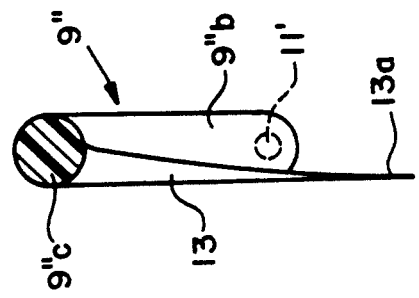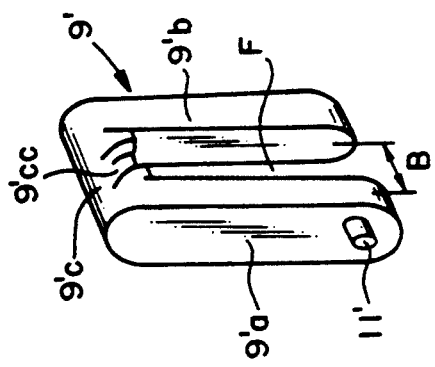

STRIPPING PLIERS

FIELD OF THE INVENTION

The present invention refers to pliers for stripping the sheathing from electrical conductors and which comprise a tool body, a pair of handles, a pair of articulated clamping jaws, a pair of articulated cutting and stripping jaws which are accommodated within the clamping jaws so as to be pressed against the adjacent clamping jaw, a two-members-aggregate for carrying and moving the cutting jaws, and possibly also a means for cutting a conductor.

BACKGROUND OF THE INVENTION

Pliers of this kind are described in U.S. Pat. Nos. 3,915,037 and 4,112,791. The cutting and stripping jaws (only "jaws" in the following) are attached to an elongated, rod-like pulling member ("pulling rod") for being pulled in a direction longitudinal to a conductor inserted in the jaws. The pulling member in its turn is driven by a driving arm which is pivoted to one of the handles. The pulling member and the driving rod embody said aggregate.

One of the jaws is rigidly connected with the pulling member by being made in one piece therewith, and the other jaw is attached with the aid of a pivot pin. The two jaws are held apart by a helical compression spring which is anchored in bores provided in the inner sides of both jaws ahead of their point of articulation. (Expressions like "ahead", "rearwardly" etc. refer in this specification and in the attached claims to the forward free ends of the jaws.)

The pulling member is provided with a projecting arm, also made integrally therewith, at the free and of which is with the aid of another pivot pin a freely rotatable roller mounted for contact with another freely rotatable roller which is with the aid of a further pivot pin mounted on the free end of the driving lever.

The driving lever itself is by a pivot pin pivotally attached to one of the handles, and is biased by a helical spring.

On the tail part of the pulling member is a coil spring threaded for constantly urging the aggregate into a forward position.

The aggregate comprises thus two main members, viz. the jaws-and-pulling-rod member, and the driving arm, and these two members comprise together twelve elements which have to be separately produced and then assembled.

OBJECT OF THE INVENTION

It is an object of the present invention to provide pliers of the kind aforesaid with a reduced number of elements which have to be separately produced and assembled. Another object of the invention is to increase the maximum stripping length of the tool at unchanged overall length thereof. By "stripping length" is understood the length of the terminal part of a conductor which can be stripped in the tool.

SUMMARY OF THE INVENTION

These objects, and others which will become apparent hereinafter, are attained with pliers for stripping the insulation from the ends of electrical conductors, which comprise in combination a tool body; a pair of handles comprising a first handle pivotally mounted to the tool body in a pivot point; a pair of articulated clamping jaws comprising a first clamping jaw pivotally mounted to the tool body in a pivot point and having an operating extension extending rearwardly of the pivot point; a pair of articulated cutting and stripping jaws located inside the pair of clamping jaws so as to be longitudinally movable therein, each of them being resiliently pressed against the adjacent clamping jaw, and a two-members aggregate for carrying and longitudinally moving the pair of cutting and stripping jaws and for driving the first clamping jaw.

A first member of said aggregate comprises the two cutting and stripping jaws, a longitudinal rod part having a forward end and continuing in a tail part having a rear end, a transverse arm means laterally projecting from the rod part, and a plastics joint means in the form of a forwardly open arc extending between two ends, located at the said forward end, and which is resilient at least along a portion of its circumference and carries at each said end one of the cutting and stripping jaws, the whole first member being integrally made of plastics material so as to embody one single component.

The second member of the aggregate embodies a resiliently biassed driving lever which with the aid of pivot means is at its one end pivotally attached to the said first handle and has an opposite free second end for drivingly affect the said operating extension and the said transverse arm means therewith.

Expediently, the end of the tail portion, defining the rear end of the first member, is shaped as a hook which, upon assembly of the tool, with its free end engages an abutment means in the tool body.

Several plastics materials (e.g. polyamide, polyethylene etc.) are currently available which are compression-resistant, have a low coefficient of friction, and are, in dependence of the shaping and dimensioning of a part made therefrom, resilient or not.

If the members of the aggregate are made of a plastics material of this kind, the rotatable roller at the free end of the transverse arm and/or of the driving lever may be substituted by a conveniently shaped, non rotatable terminal portion of the respective arm or lever.

The aggregate according to the present invention has a substantially decreased number of separate components, such as two (each of the two members being embodied by a single component), each produced in a single operation and not demanding any assembly work.

By substituting the pivot pin of the jaws and the helical spring in the jaw pair by a plastics joint shaped as a forwardly open ring (and not needing to locate in front thereof any further means to expand the jaws), the stripping length of the too may be increased with as much as approximately 50% in comparison to the tool of the prior art.

BRIEF DESCRIPTION OF THE DRAWING

The above and other objects will be better understood from the following, reference being made to the accompanying drawing, in which:

FIG. 2 shows in a lateral view at a somewhat smaller scale a first embodiment of the first member of the aggregate according to the present invention;

FIG. 3 shows in a perspective view a first embodiment of the second member of the aggregate according to the present invention;

FIG. 4 shows in a longitudial section a preferred second embodiment of the second member;

DETAILED DESCRIPTION OF THE INVENTION

Figure 1:
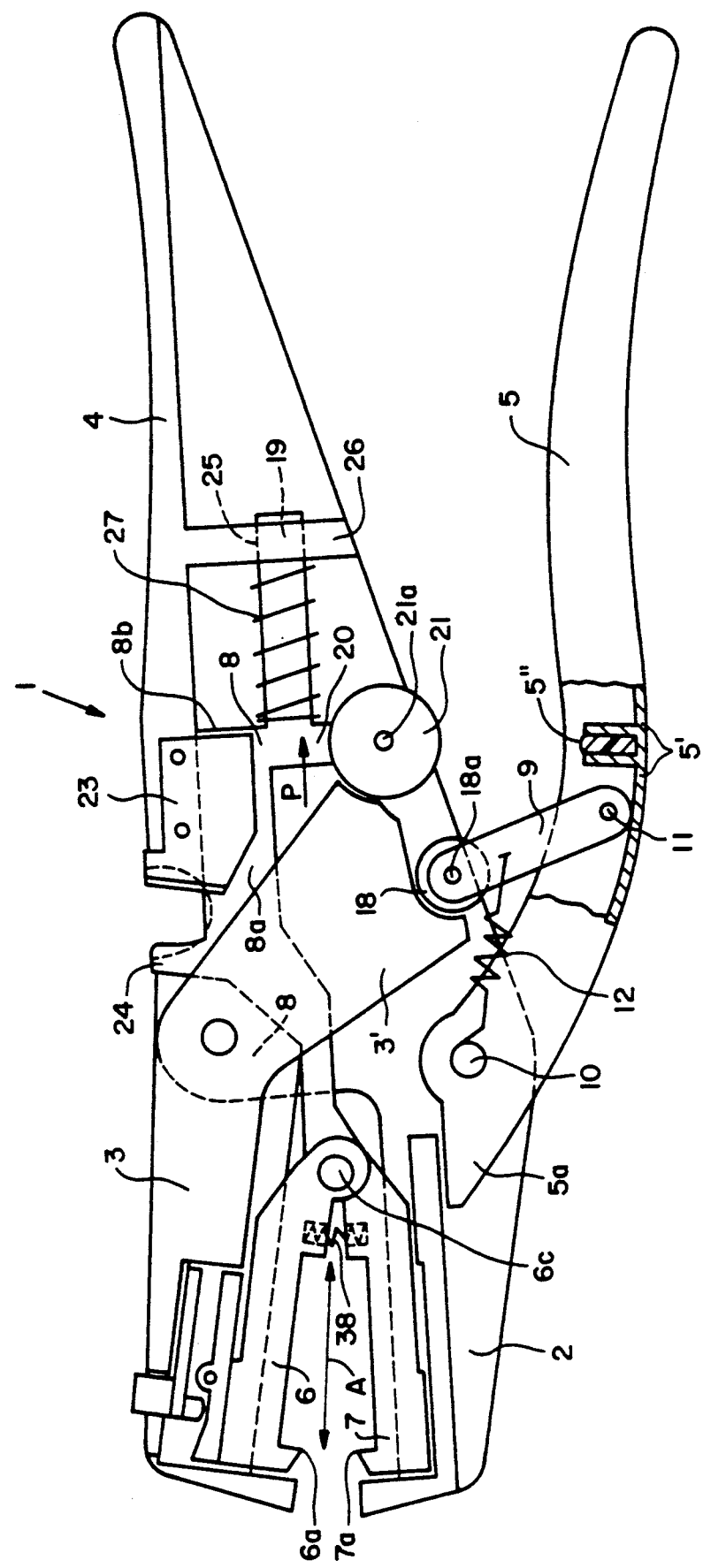
FIG. 1 shows in a longitudinal section the tool of the state of the art according to the U.S. Pat. No. 3,915,037.

The pliers 1 of the prior art according to FIG. 1 comprise two clamping jaws 2, 3, two cutting and stripping jaws 6, 7, and two handles 4, 5. The clamping jaw 2 and the handle 4 define non-movable parts of a tool body 1, to which the first clamping jaw 3 and the first handle 5 are pivotally attached.

The cutting and stripping jaw 7 is made integrally with a longitudinal pulling member 8, and the jaw 6 is pivotally attached thereto by a pivot pin 6c. In bores in the inner sides of the jaws 6, 7 is a helical expansion spring 38 anchored which constantly urges the jaws 6, 7 against the clamping jaws 2, 3. At the free ends 6a, 7a of the jaws 6, 7 are cutting (knife) means provided which are not visible in FIG. 1 (see 7"a in FIG. 6).

A conductor which shall be stripped may be introduced into the tool to a maximun stripping length A.

The central portion of the pulling means 8 is defined by a longitudinal, rod-shaped part 8a, and the rear portion by a tail part 19 having, like the central portion 8a, a rectangular cross-section. The tail part 19 is glidingly inserted in an opening with corresponding cross-section in a partition 26 in the tool body 1a. A helical compression spring 27 is threaded on the tail part 19 and abuts against the partition 26 on the one end, and a transverse arm 20 and a shoulder 8b provided on the pulling means 8 on the other end in order to constantly urge the pulling means forward.

On the free end of the transverse arm 20 is a roller 21 rotatably mounted with the aid of a pin 21a.

The first handle 5 has U-shaped cross-section and is by means of a pivot pin 10 attached to the tool body 1a. A driving lever 9 is by means of a pivot pin 11 pivotably mounted in the handle 5 and is biased by a coil spring 12 which is anchored on the said pin 10 and in a bore in the lever 9.

On the opposite free end of the driving lever 9 is with the aid of a pivot pin 18a a roller 18 rotatably mounted.

In the handle 5 is between two partitions 5' an elastomeric block 5" provided against which the roller 21 may softly abut when the handle 5 is completely swung against the tool body 1a.

The tool 1 is further provided with a cutting means for cutting a conductor to desired length, and consisting of a projection 24 on the pulling means 8 which defines a blunt nose, and of a knife blade 23 which is stationarily mounted in the tool body adjacent a recess therein.

Upon affecting the handle 5, the roller 18 affects first a rearward extension 3' of the first clamping jaw 3 so as to "close" it on jaw 2, and then the roller 21 on the transverse arm 20 so as to push the pulling means 8 rearwardly in the sense of arrow P.

For a more detailed description of the way of working of the pliers of FIG. 1, reference is made to the two above patents.

The first member of the aggregate comprises the following six or seven elements: the pulling means 8 inclusive of the jaw 7, the jaw 6, the pin 6c, the spring 38, the roller 21, the pin 21a and possibly the spring 27. The second member comprises the following five elements: the lever 9, the pin 11, the roller 18, the pin 18a, and the spring 12 (and further possibly means for anchoring the spring 12 on the lever 9)..

According to the present invention, both said members are embodied by one single element. The first member 8' in the embodiment of FIG. 2 includes both the jaws 6', 7' and the transverse arm 20' and comprises a longitudinal rod part 8'a, on the front or forward end of which is a plastics joint 40 provided which has the form of a forwardly open arc extending between two ends at which the two jaws 6', 7' are integrally attached.

The plastics joint 40 is designed so as to hold, in unaffected condition, the two jaws 6', 7' in the "open" relative position shown in FIG. 2, in which each jaw 6, 7, is, upon assembly of the tool, resiliently urged against the adjacent clamping jaw 2, 3 in the same way as shown in FIG. 1. The joint 40 is to this purpose resilient along at least a portion such as 40' of its circumference. The resilient portion may be a portion of reduced cross-sectional area, and in the example shown the portion 40' has a narrower breadth (dimension at right angles to the drawing plane).

A reduced cross-sectional area may, however, also be achieved by reducing the thickness (dimension in radial direction in FIG. 1) of the joint 40. It will be also recognized that the plastics joint 40 also may be inherently resilient along its entire circumference and "stiffened" along that portion where it is attached to the rod part 8'a. If, with such a joint, the outline of the forward end of the rod part 8'a is modified as shown by the dotted line 40", both jaws 6', 7' will be resiliently attached to the rod part, whereas with an outline according to the full drawn line, jaw 7' will be attached rigidly.

Due to the forwardly open shape of the joint 40, and to the circumference that, as distinct from the presence of the spring 38 in FIG. 1, no further expansion element needs to be provided ahead of the "deepest" point 40a of the joint 40 (which may be considered to define the point of articulation of the jaws 6', 7' in this instance), the maximum stripping length A' is considerably longer than the corresponding length A in FIG. 1.

Figure 6:
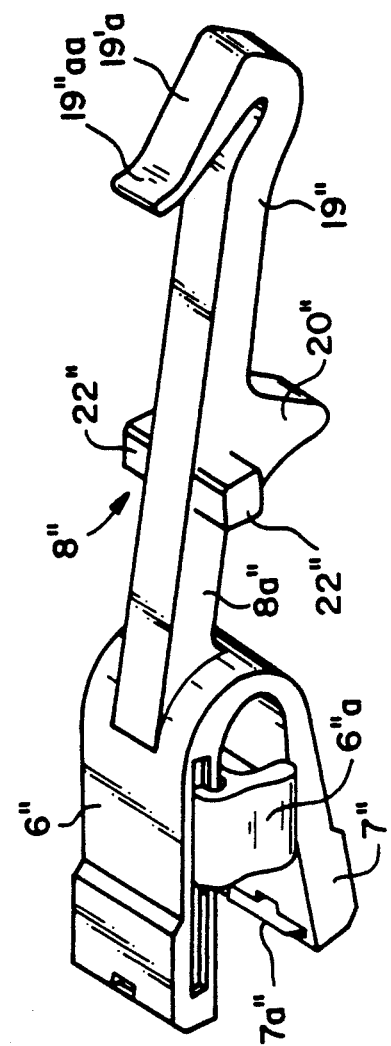
FIG. 6 shows in a perspective view at a somewhat smaller scale than FIG. 2 a second embodiment of the first member.

The free end of the tranverse arm may be rounded as shown with arm 20" in FIG. 6, or it may, as shown in FIG. 2 (when considering also the dashed portion 21' of the circumference) be shaped so as to embody a non rotatable roller. Expediently, however, only the outer circumference of such a circular roller is retained as the outer circumference of resilient, ring-shaped arm 21". Such a resilient embodiment allows to eliminate the resilient block 5" of FIG. 1 which may be substituted by any convenient, non resilient element in the handle 5, e.g. one of the partitions 5' (made somewhat thicker), or the like. Thus, still another separate element is eliminated.

An end stop 21"a limits the degree of resilient yielding of the arm 21" to a desired value.

By reducing the cross-section 8" of the rod part 8'a at a selected location relative to the rest, such as along the upper edge as shown in FIG. 2, a ridge 22', co-operating with a longitudinal groove in the tool body 1 (not shown) is obtained which defines a guiding means for the first member.

The second member of the aggregate is according to FIG. 3 embodied by a yoke 9, in the shape of a reversed U having two parallel shank parts 9'a, 9'b which are connected by a bridging part 9'c so as to be spaced one from another by a void space F with a breadth B.

At least on that portion of the bridging part 9'c, which after assembly will turned toward a co-operting part such as the transverse arm 20', is a guiding groove 9'cc provided which has a breadth corresponding to that of the element on the free end of the transverse arm 20'.

On the free ends of the shank parts 9'a, 9'b project outwardly short pivot stumps 11'. For inserting the yoke 9' in the handle 5, the shank parts 9'a, 9'b are slightly compressed one against the other and the pin stumps 11' are introduced in openings provided therefore in the U-shaped profile of the handle.

In a preferred embodiment 9'' of the second member according to FIG. 4 (which is a longitunal section closely adjacent the inner side of the shank part 9'a), a resilient tongue part 13 projects from the bridging part 9'c into the space F and extends parallelly with the shank parts 9'a, 9'b. The tongue part 13 is at least in the region of the free ends of the shank parts 9'a, 9'b narrower than the breadth B in order to allow the above described compression upon assembly, it is longer than the two shank parts, and it narrows, in cross-section, toward its free end.

Figure 5:
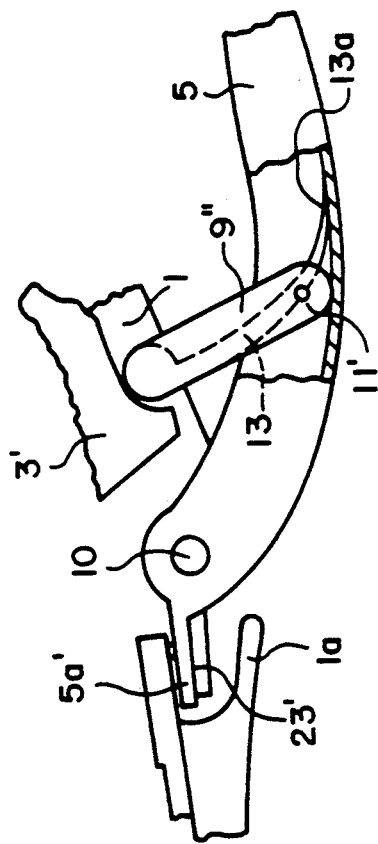
FIG. 5 shows the member of FIG. 4 in position in the first handle, and a cutting means provided in connection with this handle.

The tongue part 13a occupies after assembly the position shown in FIG. 5 and biases constantly the yoke 9' in the same way as spring 12 does in FIG. 1.

It will be appreciated that a resilient element such as the tongue part 13a may also be attached to the yoke 9' at some other place, such as nearer the free ends of the shank parts 9'a, 9'b, or e.g. one tongue part may project from the rear (as seen in FIG. 5) edge or face of each shank member, i.e. two tongue parts located outside the space F may be provided.

As well the embodiment of FIG. 4, as that of FIG. 5, are produced as one single plastics component.

To provide optionally a cutting means, a forward extension 5a' of the handle 5, present already in the tool of the prior art, may be expediently used. According to FIG. 5, a recess B, outwardly limited by a rigidly connected arm 1a shaped as a blunt abutment piece, is arranged in the tool body 1 at the location of the extension 5a' in the assembled tool, and on the extension 5a' is a knife element 23' mounted. When a conductor is introduced into the recess B in a direction at right angles to the drawing plane, and the handle 5 is pressed against the tool body 1 as when otherwise operating the tool, the conductor is by the knife 23' first pressed against the arm 1a, and then cut through.

It will be appreciated that the knife may also be arranged on the arm 1a and the extension 5a' made to define a blunt abutment means, or that knives may be provided at both locations.

In the embodiment of FIG. 6 is the coil spring 27 of FIG. 1 substituted by a resilient rearmost portion 19''a of the tail part 19'' which is made to a U-shaped hook adapted to co-operate, by its free end 19''aa, with an abutment element (not shown) such as a pin or a partition provided for this purpose in the tool body. When the first member 8'' is pushed rearwardly, the hook is compressed and biases the first member 8'' in the same manner as spring 27 does in FIG. 1.

The resilient portion of the plastics joint is defined by that part of the plastics joint which is not attached to the rod part 8''a.

The guiding means is embodied by two 1a laterally projecting blocks 22'' for which a longitudinal groove not shown) is provided in the tool body. A settable stop 6''a means selecting a shorter stripping length than the maximum one is mounted in the jaw 6''. In the jaw 7'' are stripping knife means 7''a visible.

It will be appreciated that the two-members aggregate according to the present invention may be readily inserted into a tool body according to FIG. 1 and that it operates therein in exactly the same manner as the aggregate of the prior art.

What is claimed is:

1. Pliers for stripping the insulation from the ends of electrical conductors, comprising in combination:
    a tool body;
    a pair of handles comprising a first handle pivotally mounted to the tool body, and a second handle rigidly attached to the tool body;
    a pair of clamping jaws comprising a first clamping jaw pivotally mounted to the tool body at a pivot point and having an operating extension extending rearwardly of the pivot point, and a second clamping jaw rigidly attached to the tool body;
    a pair of cutting-and-stripping jaws jointed together by a plastics joint in the shape of a forwardly opened arc having a resilient portion and adapted to hold the cutting jaws in open position resiliently urged against an adjacent clamping jaw, a longitudinal rod means issuing rearwardly from the plastics joint and having a tail part, a transverse arm means extending laterally from the longitudinal rod and having a rounded free end, and guiding means, all said pair of cutting and stripping jaws, the plastics joint, the longitudinal rod means with a tailpart, the transverse arm means and the guiding means defining a single integral component made of plastics and embodying a first member of an aggregate, and which said first member is with the aid of said guiding means slidably mounted in the tool body;
    a driving level having a first end provided with pivot means and a free second end adapted to drivingly engage the said operating extension and the said transverse arm means, the driving level with said pivot means defining a single integral component made of plastics and embodying a second member of said aggregate, and which said second member is with the aid of said pivot means pivotally mounted in the first handle, the driving level being embodied by a yoke member having two spaced part, parallel shank parts connected at their firs ends by a bridging part, said pivot means being embodied by an outwardly projecting pivot stump at the second end of each shank part, the driving level with the pivot stumps being inwardly made of plastics material so as to embody one single component.

2. The pliers of claim 1, wherein at least one resilient tongue part projects beyond the free ends of the shank parts so as to be able, after assembly, to bear with its free end against the first handle in order to resiliently bias the driving lever, the driving level with the tongue part being integrally made of plastics material so as to embody one single component.

3. The pliers of claim 2, wherein the tongue part projects from the said bridging part between and parallel with the shank parts and is at least in the region of the free ends of the shank parts narrower than the mutual spacement of the shank parts.

4. The pliers of claim 1, wherein a guiding groove is provided on the bridging part along at least a part of its circumference which and is in facing relation to the said rounded free end of the transverse arm means.

* * * * *